(12) United States Patent
Kingman et al.

(10) Patent No.: US 12,134,308 B1
(45) Date of Patent: Nov. 5, 2024

(54) SYSTEMS WITH SUPPRESSED WINDOW REFLECTIONS

(71) Applicant: Apple Inc., Cupertino, CA (US)

(72) Inventors: David E. Kingman, San Jose, CA (US); Christopher D. Jones, Los Gatos, CA (US); Derek C. Scott, Santa Clara, CA (US); James R. Wilson, Saratoga, CA (US); Martin Melcher, Mountain View, CA (US); Peter F. Masschelein, Campbell, CA (US)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 17/002,732

(22) Filed: Aug. 25, 2020

Related U.S. Application Data

(60) Provisional application No. 62/906,256, filed on Sep. 26, 2019.

(51) Int. Cl.
| | |
|---|---|
| *B60J 3/06* | (2006.01) |
| *B32B 17/10* | (2006.01) |
| *B60J 1/00* | (2006.01) |
| *B60J 3/04* | (2006.01) |
| *G02B 1/11* | (2015.01) |
| *G02B 5/30* | (2006.01) |
| *G02F 1/1335* | (2006.01) |

(52) U.S. Cl.
CPC ........... *B60J 3/06* (2013.01); *B32B 17/10036* (2013.01); *B32B 17/10504* (2013.01); *B60J 1/001* (2013.01); *B60J 3/04* (2013.01); *G02B 1/11* (2013.01); *G02B 5/3025* (2013.01); *G02F 1/133528* (2013.01); *B32B 2605/006* (2013.01); *G02F 1/133541* (2021.01); *G02F 2201/38* (2013.01)

(58) Field of Classification Search
None
See application file for complete search history.

(56) References Cited

U.S. PATENT DOCUMENTS

| | | |
|---|---|---|
| 4,973,511 A | 11/1990 | Farmer et al. |
| 6,039,390 A | 3/2000 | Agrawal et al. |
| (Continued) | | |

FOREIGN PATENT DOCUMENTS

| | | | | |
|---|---|---|---|---|
| EP | 3485327 B1 | * | 11/2021 | ............. B60R 1/088 |
| KR | 19990028992 A | * | 1/1998 | |

*Primary Examiner* — Phu Vu
(74) *Attorney, Agent, or Firm* — Treyz Law Group, P.C.; G. Victor Treyz; Kendall P. Woodruff

(57) ABSTRACT

A window may have a structural window layers such as an inner glass layer and an outer glass layer. The inner glass layer may be a layer of tempered glass. The outer glass layer may be a laminated glass layer. The inner and outer glass layers may be separated by an air gap. One or more reflection suppression layers such as antireflection layers and/or circular polarizers may be incorporated into the window to suppress reflections of light from within the interior region off of the window back towards the interior region. The antireflection layers may be formed on one or both surfaces of the inner glass and one or both surfaces of the outer glass. An electrically adjustable layer such as a guest-host liquid crystal light modulator layer or other electrically adjustable optical component layer may be interposed between the outer glass layer and the air gap.

21 Claims, 4 Drawing Sheets

(56) References Cited

U.S. PATENT DOCUMENTS

| | | | | |
|---|---|---|---|---|
| 6,129,980 | A | * | 10/2000 | Tsukada .................. G02B 1/111 |
| | | | | 349/137 |
| 6,572,990 | B1 | | 6/2003 | Oyama et al. |
| 2008/0199671 | A1 | | 8/2008 | Miyagi et al. |
| 2008/0234893 | A1 | | 9/2008 | Mitchell et al. |
| 2009/0284670 | A1 | * | 11/2009 | Xue .................. G02F 1/133536 |
| | | | | 349/16 |
| 2012/0002289 | A1 | * | 1/2012 | Shin ........................ G02B 1/11 |
| | | | | 359/601 |
| 2018/0290437 | A1 | * | 10/2018 | Kobayashi ............ E06B 3/6715 |
| 2020/0132904 | A1 | * | 4/2020 | Smith .................. G02B 5/3016 |

\* cited by examiner

SYSTEMS WITH SUPPRESSED WINDOW REFLECTIONS

This application claims the benefit of provisional patent application No. 62/906,256, filed Sep. 26, 2019, which is hereby incorporated by reference herein in its entirety.

FIELD

This relates generally to structures that pass light, and, more particularly, to windows.

BACKGROUND

Windows such as vehicle windows sometimes include multiple glass layers. If care is not taken, the glass layers may give rise to undesired reflections.

SUMMARY

A system such as a vehicle may have windows. A vehicle window may separate an interior region of the vehicle from an exterior region. A vehicle window may have a structural window layers such as an inner glass layer and an outer glass layer. The inner glass layer may be a layer of tempered glass and may face the interior region. The outer glass layer may be a laminated glass layer and may face the exterior region. The inner and outer glass layers may be separated by an air gap.

One or more reflection suppression layers such as antireflection layers and/or circular polarizers may be incorporated into the window to suppress reflections of light from the interior region off of the window, such as reflections arising from the air-glass interfaces adjacent to the air gap. These light reflections travel toward vehicle occupants in the interior region and are undesirable because they tend to interfere with the view of the occupants through the window.

The antireflection layers may be formed on one or both surfaces of the inner glass and one or both surfaces of the outer glass. An electrically adjustable layer such as a guest-host liquid crystal light modulator layer or other electrically adjustable optical component layer may be interposed between the outer glass layer and the air gap. A circular polarizer may be formed on the inner glass layer facing the interior. An antireflection layer may cover the circular polarizer.

DETAILED DESCRIPTION

Figure 1:
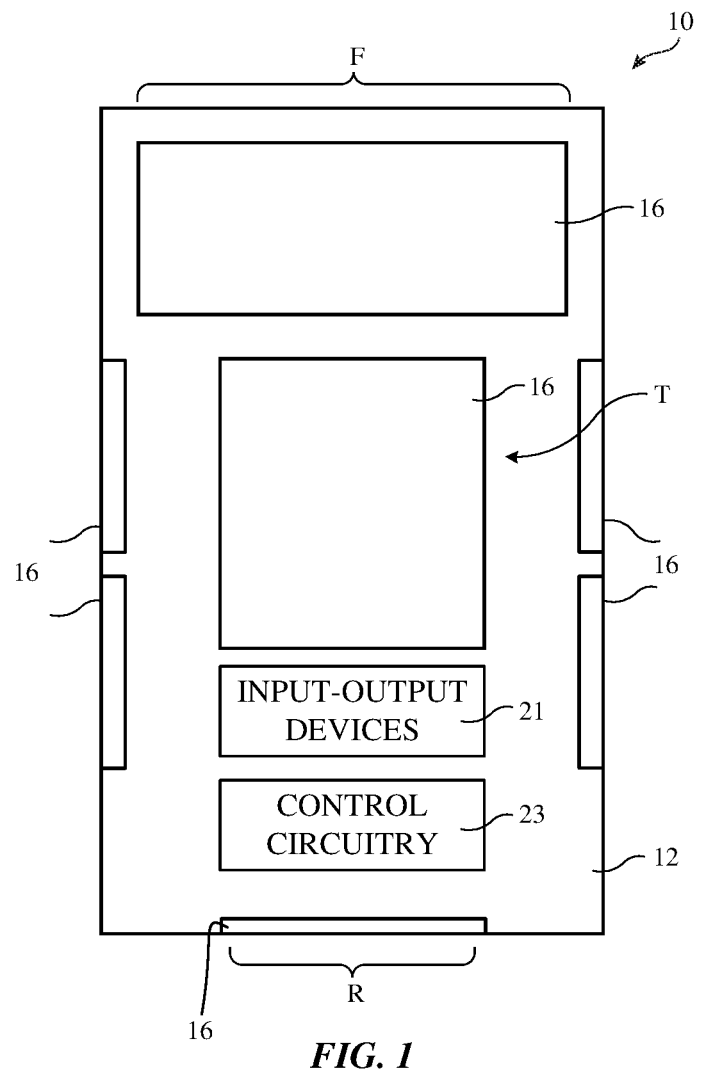
FIG. 1 is a schematic diagram of an illustrative system in accordance with an embodiment.

A system may have windows. The windows may include structures for suppressing light reflections such as antireflection coatings and circular polarizers. Optional electrically adjustable components may also be incorporated into the windows. The system may be a building, a vehicle, or other suitable system. Illustrative configurations in which the system with the windows is a vehicle may sometimes be described herein as an example. This is merely illustrative. Window structures may be formed in any suitable system.

The electrically adjustable components of the windows may be used to adjust the optical properties of the windows. For example, electrically adjustable windows may be adjusted to change the absorption of light and therefore the light transmission of the windows. An adjustable light modulator layer may, for example, serve as an electrically adjustable sunroof for a rooftop window or may be used to implement an electrically adjustable shade for a side, front, or rear window. In an illustrative configuration, the transparency of the window may be modulated using a liquid crystal light modulator such as a guest-host liquid crystal light modulator. Adjustable optical component layers may also be used to display images, to provide illumination, and/or to otherwise adjust the appearance and behavior of a window.

A window for the system may include multiple glass layers. For example, a window may include an inner transparent structural layer (sometimes referred to as an inner glass layer) and an outer transparent structural layer (sometimes referred to as an outer glass layer). The inner and outer layers of the window may be separated by a gap. The gap may be filled with air or may be filled with a polymer, liquid, or other dielectric. Illustrative configurations in which the inner and outer glass layers are separated by air are sometimes described herein as an example.

The glass layers of a window may be single-layer glass layers (e.g., single layers of tempered glass) or, in some configurations, may be multi-layer structures formed, for example, from first and second glass layers that are laminated together. A laminated glass layer may have a polymer such as polyvinyl butyral (PVB) that joins first and second glass layers to form a sheet of laminated glass. Multi-layer glass structures (laminated glass layers formed from two or more laminated glass layers with interposed PVB) and single-layer glass layers may include optional tinting (e.g., dye, pigment, etc.). Polymer layers in laminated glass layers (e.g., PVB layers) may also optionally be tinted.

A window such as a window with first and second layers separated by an air gap has multiple glass-air interfaces, which gives rise to a risk of undesired light reflections. To suppress light reflections, one or more of the exposed surfaces of the glass layers in the window may be provided with antireflection coatings, circular coatings, and/or other layers for suppressing light reflections. These antireflection structures may, as an example, be used to suppress light reflections arising from the air-glass interfaces at the surfaces of the first and second window layers that are adjacent to the air gap.

An illustrative system of the type that may include windows with one or more light reflection suppression layers for suppressing reflections is shown in FIG. 1. As shown in FIG. 1, system 10 may be a vehicle having a body such as body 12 with a chassis to which wheels are mounted, propulsion and steering systems, and other vehicle systems. Body 12 may include doors, trunk structures, a hood, side body panels, a roof, and/or other body structures. Seats may be formed in the interior of body 12. Vehicle 10 may include windows such as window(s) 16. Window 16 and portions of body 12 may separate the interior of vehicle 10 from the exterior environment that is surrounding vehicle 10.

Windows 16 may include a front window 16 on front F of vehicle 10, a moon roof (sun roof) window 16 or other window extending over some or all of top T of vehicle 10, a rear window 16 on rear R of vehicle 10, and side windows on the sides of vehicle 10 between front F and rear R.

Input-output devices 21 may include sensors, audio components, displays, and other components for providing output to an occupant of vehicle 10 and for making measurements of the environment surrounding vehicle 10 and gathering input from an occupant of vehicle 10. Control circuitry 23 may include storage and processing circuitry such as volatile and non-volatile memory, microprocessors, application-specific integrated circuits, digital signal processors, microcontroller, and other circuitry for controlling the operation of vehicle 10. During operation, control circuitry 23 may control the components of vehicle 10 based on input from input-output devices 21.

Figure 2:
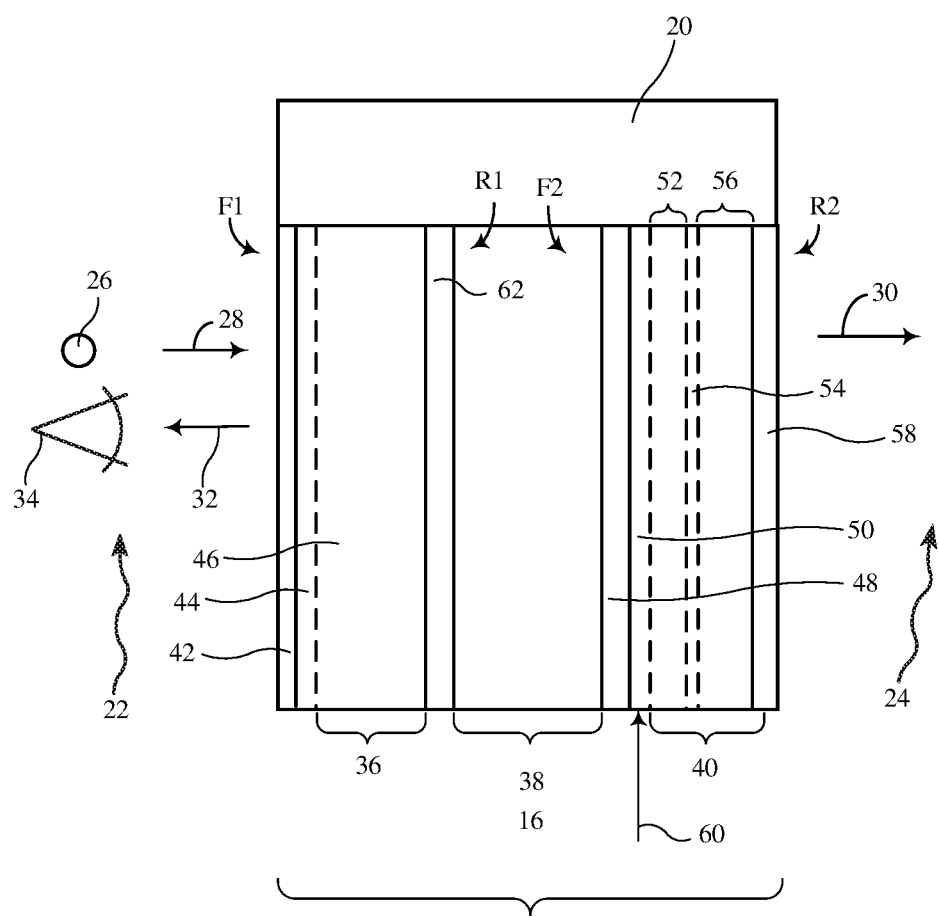
FIG. 2 is a cross-sectional side view of an illustrative window for the system of FIG. 1 in accordance with an embodiment.

An illustrative configuration for a window such as one of windows 16 of FIG. 1 is shown in FIG. 2. As shown in FIG. 2, window 16 may separate interior region 22 (e.g., a region inside vehicle 10) from exterior region 24 (e.g., a region on the outside of vehicle 10). A light source such as light source 26 and/or ambient light in interior 22 may travel outwardly towards window 16, as shown by illustrative outgoing light 28. Some of light 28 may be transmitted through window 16 as shown by transmitted light 30. A portion of light 28 may also reflect off of window 16 inwardly from one or more of the interfaces between the layers of window 16, as shown by reflected light 32. To help reduce the amount of reflected light 32 that is viewed by an occupant of vehicle 10 such as viewer 34, window 16 may have reflection suppression structures such as antireflection layers and/or circular polarizers. The reflection suppression structures may suppress light reflections arising from the air-glass interfaces adjacent to an internal window air gap and may optionally suppress other light reflections such as light reflections associated with external window surfaces. In an illustrative configuration, light reflections are reduced sufficiently that the amount of light 28 that is reflected as light 32 toward viewer 34 is less than 15%, less than 10%, less than 8%, etc.

Illustrative window 16 of FIG. 2 may include a pair of main structural portions such as inner structural window layer 36 and outer structural window layer 40 supported by portions of body 12 and/or other support structures (see, e.g., illustrative support structures 20). Layers 36 and 40, which may sometimes be referred to as inner and outer window layers or inner and outer glass layers, may be formed from single-layer glass structures and/or multi-layer glass structures. These layers may be strengthened (e.g., by annealing, tempering, and/or chemical strengthening). In general, inner glass layer 36 may be a single-layer glass structure (e.g., a single layer of tempered glass) or a laminated glass layer and outer glass layer 40 may be a single-layer glass structure (e.g., a single layer of tempered glass) or a laminated glass layer. In the example of FIG. 2, inner glass layer 36 is a single layer of tempered glass and outer glass layer 40 is a laminated glass layer formed from first glass layer 52 and second glass layer 56. First glass layer 52 and second glass layer 56 of this laminated glass layer may be laminated together using polymer layer 54. Polymer layer 54 may be a layer of polyvinyl butyral or other suitable polymer for attaching layers 52 and 56 together.

Layers 36 and 40 may be separated by an air gap such as gap 38. In some configurations, air gap 38 may be filled with polymer and/or liquid. Configurations in which gap 38 is filled with air are sometimes described herein as an example.

The air interfaces between layers of window 16 and surrounding air (e.g., air in region 22, air in gap 38, and air in region 24) give rise to a risk of undesired light reflections (e.g., undesired light 32). To suppress these reflections, one or more light reflection suppression layers such as antireflection layers and/or circular polarizers may be added to one or more of these air-glass interfaces in window 16. As shown in FIG. 2, for example, inwardly facing surface F1 of inner glass layer 36 may be provided with antireflection layer 42, opposing outwardly facing surface R1 of inner glass layer 36 may be provided with antireflection layer 62, inwardly facing surface F2 of layer 40 may be provided with antireflection layer 48, and/or opposing outwardly facing surface R2 of layer 40 may be provided with antireflection layer 58. The presence of antireflection layers such as these may reduce reflections of light 28 towards interior region 22 as light 28 transits each of these interfaces (e.g., interfaces where there is potentially a sizeable refractive index difference such as a change in refractive index of at least 0.1, at least 0.25, or at least 0.4). In particular, the incorporation of reflection suppression layers on the window surfaces facing air gap 38 may help to suppress internal light reflections that make window 16 appear hollow.

Light reflections can also be suppressed by including circular polarizer 44 in window 16 (e.g., on front surface F1 of inner glass layer 36). Circular polarizer layers such as circular polarizer 44 help prevent light reflections by altering the polarization of transmitted light (e.g., by changing unpolarized light to right-hand-circularly polarized light). When the light transmitted through polarizer 44 reflects from subsequently encountered interfaces (e.g., surfaces F1, R1, F2, and R2), this reflected light will have an opposite circular polarization (e.g., left-hand circularly polarization in this example) and will be blocked on returning through the circular polarizer. The presence of the circular polarizer thereby reduces reflections from the air-glass interfaces of window 16 (including, in particular, reflections from air-glass interfaces at air gap 38) and helps reduce the magnitude of reflected light 32 viewed by viewer 34.

If desired, window 16 may include one or more adjustable optical layers (e.g., an adjustable polarizer, an adjustable reflectivity layer such as an adjustable mirror, an adjustable absorber, which may sometimes be referred to as an adjustable light modulator layer or light modulator layer, a layer exhibiting adjustable color, an adjustable haze layer, and/or other adjustable layers). As an example, window 16 may include adjustable layer 50. Adjustable layer 50 may be, as an example, an electrically adjustable guest-host liquid crystal layer that receives control signals from control circuitry 23 via control input 60. The guest-host liquid crystal layer can be adjusted to exhibit a higher level of light transmission (e.g., at least 80% or other suitable first amount) or a reduced, lower level of light transmission (e.g., a second amount lower than the first amount such as an amount less than 80%, less than 50%, or less than 20%, as examples).

In arrangements in which adjustable layer 50 is a guest-host liquid crystal light modulator, layer 50 may have first and second transparent substrates. Transparent conductive electrodes may be formed on the surfaces of the substrates that face each other. The transparent conductive electrodes may be formed from indium tin oxide or other transparent conductive material. A layer of liquid crystal material may be interposed between the electrodes. The liquid crystal material may include guest dye molecules and host liquid crystal molecules. The dye molecules may have anisotropic light absorption properties. The orientation of the guest dye molecules may be controlled by electrically controlling the orientation of the host liquid crystal molecules (e.g., by using control circuitry 23 in vehicle 10 to adjust the voltage across the electrodes). As a result, the light absorption through layer 50 (e.g., visible light absorption) can be electrically adjusted.

When layer 50 is incorporated into window 16, the amount of light that passes through window 16 may be adjusted dynamically during operation of vehicle 10 (e.g., to reduce bright light and thereby dim interior region 22, to block interior region 22 from view from exterior region 24 to enhance privacy, etc.). Window 16 may be a roof-top window, a side window, or a rear window.

The inclusion of air gap 38 in window 16 may help prevent damage to layer 50 and may help window 16 provide vehicle with thermal insulation and acoustic isolation. Layer 50 may, as shown in FIG. 2, be interposed between antireflection layer 48 and the inwardly facing surface of glass layer 52 in outer glass layer 40. In this configuration, antireflection layer 48 may help suppress reflections that would otherwise occur at the interface between air gap 38 and layer 50.

It may be desirable to include an additive into one or more of the layers of window 16 to change the optical properties of window 16 (light transmission, light reflection, light absorption, haze, etc.) at visible light wavelengths and/or at ultraviolet and/or infrared wavelengths. In some configurations, for example, infrared-light-blocking properties are provided by coating layers in window 16. As an example, one or more of the layers of window 16 such as one or more of the layers in outer window glass 40 may be provided with a low-emissivity coating layer such as a layer of indium tin oxide. A low-emissivity coating may help block heat and thereby prevent interior 22 from becoming overly hot. A low-emissivity coating may be deposited onto one of the glass layer(s) in layer 40 (e.g., on an inner surface). During exposure of window 16 to light (e.g., solar radiation), visible light and near infrared light may be absorbed by the layers of window 16 (e.g., layer 40, etc.) and may re-radiate this absorbed energy as heat (e.g., infrared light at wavelengths of 3-10 microns, at least 4 microns, etc.). A low-emissivity coating on the inner surface of outer glass layer 40 or other suitable surface in layer 40 may block this heat and thereby enhance thermal comfort in the interior portions of vehicle 10.

In some configurations, an additive may be used to change light transmission magnitude and/or color for window 16. The additive(s) added to the layer(s) of window 16 may include neutral-color additive associated with a neutral color such as gray or black and/or a colorant associated with a non-neural color (e.g., red, green, blue, etc.). If desired, polymer layer 54 may be tinted (e.g., with a light blue colorant and/or other additive) and/or an additive may be added to layer 56 and/or layer 52 (e.g., iron oxide may be added to the glass of layer 52 and/or layer 56 to adjust light transmission). With an illustrative arrangement, an additive such as iron oxide is added to layer 56 to reduce light transmission through layer 56 to a value in the range of 60-90% or 70-80% (as examples). The iron oxide and/or other tint may also provide layer 56 with a greenish color or other suitable color. By tinting one or more layers in layer 40, light transmission through outer window layer 40 may be reduced to a desired value (e.g., to less than 80%, less than 75%, less than 60%, less than 40%, less than 20%, or other suitable value), thereby blocking exterior light and enhancing comfort for occupants of vehicle 10. When the light transmission of window 16 is reduced in this way, interior light reflections off of window 16 tend to become more comparable in magnitude to light entering interior region 22 than would otherwise be the case. This can enhance the value of the antireflection measures taken with window 16 to the occupants of vehicle 10.

Antireflection layers for window 16 may be formed by coatings on glass layers or other layers of window 16 and/or may be formed by attaching antireflection films to the layers of window 16. Antireflection structures may be formed from thin-film-interference-filters (e.g., thin-film antireflection layers formed from a stack of alternating higher and lower refractive index dielectric layers of polymer and/or inorganic dielectric materials), may be formed from moth-eye textured coatings and/or other textured coatings, may be formed from graded index layers, may be formed from a surface etched or otherwise processed to selectively reduce its refractive index, and/or other antireflection structures. Thin-film layers for a thin-film antireflection coating may be deposited using physical vapor deposition, pyrolytic coating techniques, spraying, spin coating, wet coating, and/or other coating techniques. In some configurations, antireflection layers can be formed on flexible substrates that are attached to the layers of window 16 using adhesive.

Figure 3:
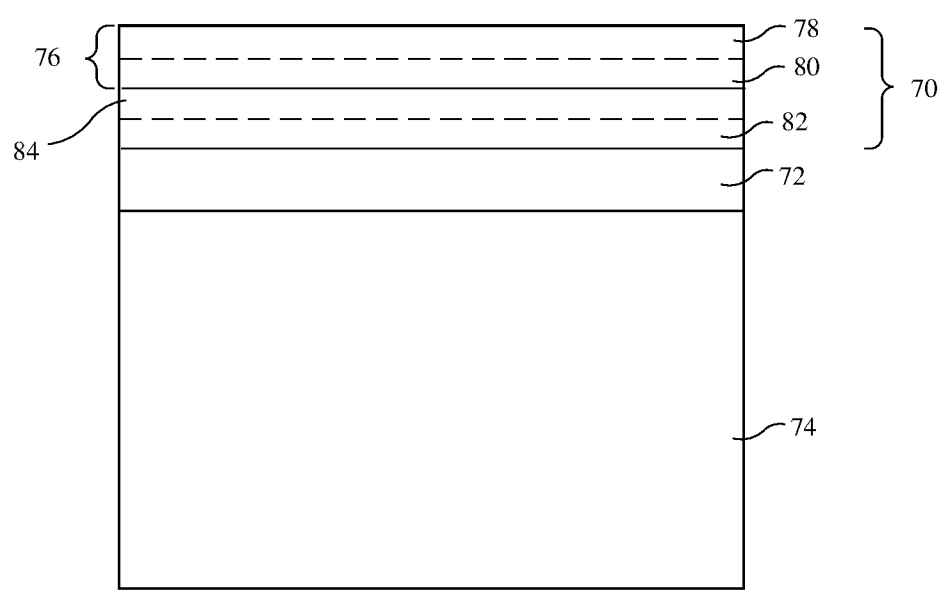
FIG. 3 is a cross-sectional side view of an illustrative antireflection layer for the illustrative window of FIG. 2 in accordance with an embodiment.

A cross-sectional side view of an illustrative antireflection layer formed using a flexible substrate is shown in FIG. 3. In the example of FIG. 3, antireflection layer 70 has been attached to substrate 74 (e.g., inner glass layer 36 or outer glass layer 40 of FIG. 2) using a layer of clear adhesive 72 (e.g., clear epoxy, clear polyurethane, clear acrylic, and/or other transparent adhesive). Layer 70 includes antireflection coating 76 on flexible substrate layer 82. Flexible substrate layer 82 may be a clear layer of polymer such as a tri-acetyl cellulose layer or other flexible polymer film. Coating 76 may include a single layer of dielectric or multiple dielectric layers (see, e.g., thin-film layers 78 and 80). Optional hard coat layer 84 may be formed on the surface of layer 82. In a first illustrative configuration, layer 76 is a single lower refractive index layer (e.g., a transparent thin-film layer having a refractive index of less than 1.4 or less than 1.3 (as examples). In a second illustrative configuration, layer 76 has a lower refractive index layer such as layer 78 (e.g., a layer with a refractive index of 1.05-1.4) and a higher refractive index layer such as layer 80 (e.g., a layer with a refractive index higher than the refractive index of layer 78 such as a refractive index of 1.2-1.6). Due to the presence of antireflection coating 76, the overall transmittance at each window interface covered with layer 70 may be, for example, at least 95% (while exhibiting haze of less than 0.4%).

Figure 4:
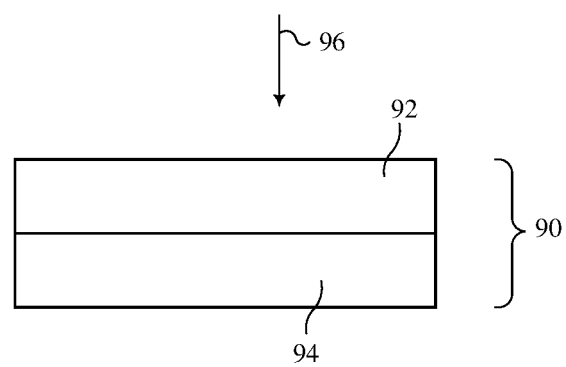
FIG. 4 is a cross-sectional side view of an illustrative circular polarizer for the illustrative window of FIG. 2 in accordance with an embodiment.

FIG. 4 is a cross-sectional side view of an illustrative circular polarizer that may be used in window 16 (e.g., as optional circular polarizer 44). As shown in FIG. 4, circular polarizer 90 may have a linear polarizer layer such as linear polarizer 92 attached to a wave plate layer such as quarter wave plate 94. As light 96 passes through polarizer 92, this light becomes linearly polarized in alignment with the pass axis of polarizer 92. After passing through quarter wave plate 94, the linearly polarized light becomes circularly polarized. As described in connection with FIG. 2, air-glass interface reflections in window 16 may be suppressed by incorporation of circular polarizer 90 into window 16 (e.g., on surface F1 between antireflection layer 42 and inner glass layer 36).

The foregoing is merely illustrative and various modifications can be made to the described embodiments. The foregoing embodiments may be implemented individually or in any combination.

What is claimed is:

1. A vehicle window configured to separate an interior region from an exterior region, comprising:

a first structural window layer having a first inwardly facing surface and an opposing first outwardly facing surface;

a second structural window layer that is separated from the first structural window layer by an air gap, wherein the second structural window layer has a second inwardly facing surface and an opposing second outwardly facing surface;

an adjustable optical component layer interposed between the second structural window layer and the air gap; and an antireflection layer configured to suppress reflection of light toward the interior region from the interior region, wherein the antireflection layer is interposed between the second structural window layer and the interior region.

2. The vehicle window defined in claim 1 further comprising a circular polarizer configured to suppress the reflection of light toward the interior region.

3. The vehicle window defined in claim 1 further comprising a circular polarizer on the first inwardly facing surface.

4. The vehicle window defined in claim 1 further comprising an additional antireflection layer on the first inwardly facing surface.

5. The vehicle window defined in claim 1 further comprising an additional antireflection layer on the first outwardly facing surface.

6. The vehicle window defined in claim 1 further comprising an additional antireflection layer on the adjustable optical component layer, wherein the adjustable optical component layer is on the second inwardly facing surface.

7. The vehicle window defined in claim 1 wherein the antireflection layer is on the second outwardly facing surface.

8. The vehicle window defined in claim 1 wherein the antireflection layer comprises a thin-film layer on a flexible substrate.

9. The vehicle window defined in claim 1 wherein the antireflection layer comprises a first dielectric layer having a first refractive index and a second dielectric layer having a second refractive index that is greater than the first refractive index and has a flexible substrate, wherein the second dielectric layer is interposed between the first dielectric layer and the flexible substrate.

10. The vehicle window defined in claim 1 wherein the first structural window layer comprises a tempered layer of glass.

11. The vehicle window defined in claim 1 wherein the second structural window layer comprises a laminated glass layer having a first layer of glass, a second layer of glass, and a layer of polymer between the first layer of glass and the second layer of glass.

12. The vehicle window defined in claim 1 wherein the second structural window layer is configured to exhibit a light transmission of less than 80%.

13. The vehicle window defined in claim 1 wherein the second structural window comprises first and second glass layers that are laminated together with polymer and wherein the second glass layer is configured to exhibit a light transmission of less than 80%.

14. A vehicle window configured to separate an interior region from an exterior region, comprising:
   a first structural window layer, wherein the first structural window layer has a first inwardly facing surface that faces the interior region and an opposing outwardly facing surface;
   a second structural window layer separated from the first structural window layer by an air gap; and
   a circular polarizer on the first inwardly facing surface of the first structural window layer that is configured to suppress reflection of light toward the interior region from the interior region.

15. The vehicle window defined in claim 14 wherein the second structural window layer has a second inwardly facing surface and an opposing second outwardly facing surface.

16. The vehicle window defined in claim 15 further comprising a first antireflection layer on the circular polarizer, a second antireflection layer on the first outwardly facing surface, a third antireflection layer on the second inwardly facing surface, and a fourth antireflection layer on the second outwardly facing surface.

17. A vehicle window configured to separate an interior region from an exterior region, comprising:
   a first structural window layer having a first inwardly facing surface and an opposing first outwardly facing surface, wherein the first outwardly facing surface faces the interior region;
   a second structural window layer that is separated from the first structural window layer by an air gap, wherein the second structural window layer has a second inwardly facing surface and an opposing second outwardly facing surface; and
   an antireflection layer configured to suppress reflection of light toward the interior region from the interior region, wherein the antireflection layer is formed on the first outwardly facing surface of the first structural window layer.

18. The vehicle window defined in claim 17 wherein the antireflection layer is configured to suppress the reflection of light to a value of less than 10%.

19. The vehicle window defined in claim 17 further comprising an additional antireflection layer on the second inwardly facing surface.

20. The vehicle window defined in claim 17 further comprising a circular polarizer on the first inwardly facing surface.

21. The vehicle window defined in claim 17 further comprising:
   a circular polarizer on the first inwardly facing surface; and
   an additional antireflection layer on the circular polarizer.

* * * * *

UNITED STATES PATENT AND TRADEMARK OFFICE
CERTIFICATE OF CORRECTION

PATENT NO. : 12,134,308 B1
APPLICATION NO. : 17/002732
DATED : November 5, 2024
INVENTOR(S) : David E. Kingman et al.

It is certified that error appears in the above-identified patent and that said Letters Patent is hereby corrected as shown below:

On the Title Page

Item (57), Line 1, "a structural window layers" should read -- structural window layers --

Signed and Sealed this
Seventeenth Day of December, 2024

Derrick Brent
*Acting Director of the United States Patent and Trademark Office*